(12) United States Patent
Sampsell

(10) Patent No.: US 8,390,916 B2
(45) Date of Patent: Mar. 5, 2013

(54) SYSTEM AND METHOD FOR FALSE-COLOR SENSING AND DISPLAY

(75) Inventor: Jeffrey B. Sampsell, Pueblo West, CO (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 29 days.

(21) Appl. No.: 12/826,494

(22) Filed: Jun. 29, 2010

(65) Prior Publication Data

US 2011/0317245 A1    Dec. 29, 2011

(51) Int. Cl.
*G02B 26/00*    (2006.01)
(52) U.S. Cl. .......................... 359/290; 359/291
(58) Field of Classification Search ............. 359/290, 359/291
See application file for complete search history.

(56) References Cited

U.S. PATENT DOCUMENTS

| | | |
|---|---|---|
| 4,441,791 A | 4/1984 | Hornbeck |
| 4,571,603 A | 2/1986 | Hornbeck et al. |
| 4,748,366 A | 5/1988 | Taylor |
| 4,859,060 A | 8/1989 | Katagiri et al. |
| 4,954,789 A | 9/1990 | Sampsell |
| 5,083,857 A | 1/1992 | Hornbeck |
| 5,216,537 A | 6/1993 | Hornbeck |
| 5,226,099 A | 7/1993 | Mignardi et al. |
| 5,315,110 A | 5/1994 | Smith |
| 5,489,952 A | 2/1996 | Gove et al. |
| 5,526,172 A | 6/1996 | Kanack |
| 5,530,240 A | 6/1996 | Larson et al. |
| 5,550,373 A | 8/1996 | Cole et al. |
| 5,551,293 A | 9/1996 | Boysel et al. |
| 5,629,521 A | 5/1997 | Lee et al. |
| 5,815,141 A | 9/1998 | Phares |
| 5,894,686 A | 4/1999 | Parker et al. |
| 5,977,945 A | 11/1999 | Ohshima |
| 6,014,121 A | 1/2000 | Aratani et al. |

(Continued)

FOREIGN PATENT DOCUMENTS

| | | |
|---|---|---|
| EP | 0 649 010 | 4/1995 |
| EP | 0 725 380 | 8/1996 |

(Continued)

OTHER PUBLICATIONS

Brank et al., Sep. 2001, RF MEMS-based tunable filters, International Journal of RF and Microwave Computer-Aided Engineering, 11(5):276-284.

(Continued)

*Primary Examiner* — James Jones
(74) *Attorney, Agent, or Firm* — Knobbe Martens Olson & Bear, LLP

(57) ABSTRACT

A system and method for determining humidity based on determination of an offset voltage shift are disclosed. In one embodiment, a system for determining humidity comprises an electromechanical device comprising a first layer, a second layer, and a dielectric between the two layers, wherein the dielectric is spaced apart from at least one of the first and second layers in an unactuated state of the electromechanical device, and wherein the dielectric contacts both the first and second layers in an actuated state of the electromechanical device, a voltage source configured to apply, between the first and second layers, one or more voltages, and a processor configured to control the voltage source, to determine an offset voltage shift based on the applied voltages, and to determine information regarding humidity about the device based on the offset voltage shift.

39 Claims, 16 Drawing Sheets

U.S. PATENT DOCUMENTS

| | | | |
|---|---|---|---|
| 6,040,937 | A | 3/2000 | Miles |
| 6,295,048 | B1 | 9/2001 | Ward et al. |
| 6,304,297 | B1 | 10/2001 | Swan |
| 6,307,194 | B1 | 10/2001 | Fitzgibbons et al. |
| 6,666,561 | B1 | 12/2003 | Blakley |
| 6,674,562 | B1 | 1/2004 | Miles et al. |
| 6,737,979 | B1 | 5/2004 | Smith et al. |
| 6,819,469 | B1 | 11/2004 | Koba |
| 6,829,132 | B2 | 12/2004 | Martin et al. |
| 7,123,216 | B1 | 10/2006 | Miles |
| 7,138,984 | B1 | 11/2006 | Miles |
| 7,184,368 | B2 | 2/2007 | Johansen et al. |
| 7,280,265 | B2 | 10/2007 | Miles |
| 7,327,510 | B2 | 2/2008 | Cummings et al. |
| 7,369,294 | B2 | 5/2008 | Gally et al. |
| 7,446,926 | B2 | 11/2008 | Sampsell |
| 7,460,246 | B2 | 12/2008 | Kothari |
| 7,535,466 | B2 | 5/2009 | Sampsell et al. |
| 7,554,714 | B2 | 6/2009 | Chui et al. |
| 7,586,484 | B2 | 9/2009 | Sampsell et al. |
| 7,595,926 | B2 | 9/2009 | Sasagawa et al. |
| 7,653,371 | B2 | 1/2010 | Floyd |
| 7,657,242 | B2 | 2/2010 | Floyd |
| 7,660,028 | B2 | 2/2010 | Lan |
| 7,710,371 | B2 * | 5/2010 | Mei et al. .................. 345/85 |
| 7,787,130 | B2 | 8/2010 | Webster |
| 7,787,171 | B2 | 8/2010 | Webster |
| 7,808,703 | B2 | 10/2010 | Gally et al. |
| 7,852,483 | B2 | 12/2010 | Kothari |
| 7,852,491 | B2 | 12/2010 | Webster |
| 7,860,668 | B2 | 12/2010 | Khazeni |
| 7,881,686 | B2 | 2/2011 | Floyd |
| 7,903,047 | B2 | 3/2011 | Cummings |
| 7,920,135 | B2 | 4/2011 | Sampsell et al. |
| 7,929,196 | B2 | 4/2011 | Gally et al. |
| 2002/0075555 | A1 | 6/2002 | Miles |
| 2003/0112507 | A1 | 6/2003 | Divelbiss et al. |
| 2003/0117382 | A1 | 6/2003 | Pawlowski et al. |
| 2003/0128197 | A1 | 7/2003 | Turner et al. |
| 2004/0024580 | A1 | 2/2004 | Salmonsen et al. |
| 2005/0001797 | A1 | 1/2005 | Miller et al. |
| 2005/0068254 | A1 | 3/2005 | Booth |
| 2005/0105098 | A1 * | 5/2005 | Johansen et al. .............. 356/506 |
| 2006/0066596 | A1 | 3/2006 | Sampsell et al. |
| 2006/0176241 | A1 | 8/2006 | Sampsell |
| 2007/0023851 | A1 | 2/2007 | Hartzell et al. |
| 2007/0089516 | A1 | 4/2007 | Khuri-Yakub et al. |
| 2007/0200839 | A1 | 8/2007 | Sampsell |
| 2007/0247406 | A1 | 10/2007 | Zhou et al. |
| 2007/0272026 | A1 | 11/2007 | Toy et al. |
| 2008/0112031 | A1 | 5/2008 | Gally et al. |
| 2008/0288225 | A1 | 11/2008 | Djordjev |
| 2009/0207473 | A1 | 8/2009 | Bita et al. |
| 2009/0219542 | A1 * | 9/2009 | Waegli et al. ................. 356/451 |
| 2009/0244543 | A1 | 10/2009 | Webster |
| 2009/0244679 | A1 | 10/2009 | Khazeni |
| 2009/0267869 | A1 | 10/2009 | Gally et al. |
| 2009/0267953 | A1 | 10/2009 | Sampsell et al. |
| 2009/0308452 | A1 | 12/2009 | Sasagawa et al. |
| 2010/0117761 | A1 | 5/2010 | Floyd |
| 2010/0123706 | A1 | 5/2010 | Lan |
| 2010/0220248 | A1 | 9/2010 | Miles |
| 2011/0071775 | A1 | 3/2011 | Khazeni |
| 2011/0085278 | A1 | 4/2011 | Floyd |
| 2011/0102800 | A1 | 5/2011 | Bita |
| 2011/0115690 | A1 | 5/2011 | Cummings |
| 2011/0148828 | A1 | 6/2011 | Sampsell et al. |
| 2011/0176196 | A1 | 7/2011 | Govil et al. |

FOREIGN PATENT DOCUMENTS

| | | |
|---|---|---|
| WO | WO 2004/066256 | 8/2004 |
| WO | WO 2005/066596 | 7/2005 |

OTHER PUBLICATIONS

Miles, A New Reflective FPD Technology Using Interferometric Modulation, Journal of the SID 5/4, 1997, pp. 379-382.

Miles, "MEMS-based interferometric modulator for display applications," Proceedings of SPIE, vol. 3876, Aug. 1999, pp. 20-281.

Miles et al., 10.1: Digital Paper™ for reflective displays, SID 02 Digest, pp. 115-117, 2002.

Winton, John M., A novel way to capture solar energy, Chemical Week, pp. 17-18 (May 15, 1985).

Wu, Design of a Reflective Color LCD Using Optical Interference Reflectors, ASIA Display '95, pp. 929-931 (Oct. 16, 1995).

Mendez et al., 1992, Micromachined fabry-perot interferometer with corrugated silicon diaphragm for fiber optic sensing applications, SPIE, 1793:170-182.

Invitation to Pay Additional Fees dated Oct. 25, 2011 in PCT/US11/040571.

IPRP dated Aug. 17, 2012 in PCT/US11/040571.

Written Opinion dated May 29, 2012 in PCT/US11/040571.

ISR and WO dated Jan. 25, 2012 in PCT/US11/040571.

* cited by examiner

SYSTEM AND METHOD FOR FALSE-COLOR SENSING AND DISPLAY

BACKGROUND

1. Field

The field of the invention relates to sensors configured to display a false-color image.

2. Description of the Related Technology

Electromechanical systems include devices having electrical and mechanical elements, actuators, transducers, sensors, optical components (e.g., mirrors, prisms, and/or lens), and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers or that add layers to form electrical and electromechanical devices. In the following description, the term MEMS device is used as a general term to refer to electromechanical devices, and is not intended to refer to any particular scale of electromechanical devices unless specifically noted otherwise.

One type of electromechanical systems device is called an interferometric modulator. As used herein, the term interferometric modulator or interferometric light modulator refers to a device that selectively absorbs, transmits, and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description" one will understand how the features of this invention provide advantages over other display devices.

In one aspect a sensor comprises a hermetically sealed cell at least partially defined by a first layer which is at least partially reflective and a second layer which is at least partially reflective and is positioned apart from the first layer and substantially parallel to the first layer.

In one aspect, a sensor comprises a first layer which is at least partially reflective, a second layer which is at least partially reflective and is positioned apart from the first layer and substantially parallel to the first layer, and a scaling material between the first and second layers, wherein the distance between the first and second layers is dependent on the size of the scaling material, and wherein the size of the scaling material is dependent on the concentration of a particular gas about the sensor.

In one aspect a sensor comprises a two-dimensional array of modulators, wherein each modulator comprises a first layer which is at least partially reflective and a second layer which is at least partially reflective and spaced apart from the first layer, and a proof mass attached to the two-dimensional array.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As mentioned above, an interferometric modulator selectively absorbs, transmits, and/or reflects light using the principles of optical interference. In one embodiment, an interferometric modulator comprises two conductive layers capable of relative motion upon application of an appropriate electrical signal, described further below with respect to FIGS. 1-7. However, other forces may move the two layers with respect to each other, including but not limited to pressure applied to an array, acceleration applied to a mass, force due to thermal expansion, or a magnetic field applied to a current.

The reflective properties of an interferometric modulator are based, at least partially, on the distance between the first and second layers. Thus, the force applied to an interferometric modulator, be it electric, magnetic, or mechanical, alters the reflective properties of the device, such as the color or intensity of reflected light. A user could therefore determine the forces applied to the device simply by looking at the interferometric modulator. In one embodiment, an array of interferometric modulators displays a false-color image representative of the forces applied to various portions of the array.

Figure 1:
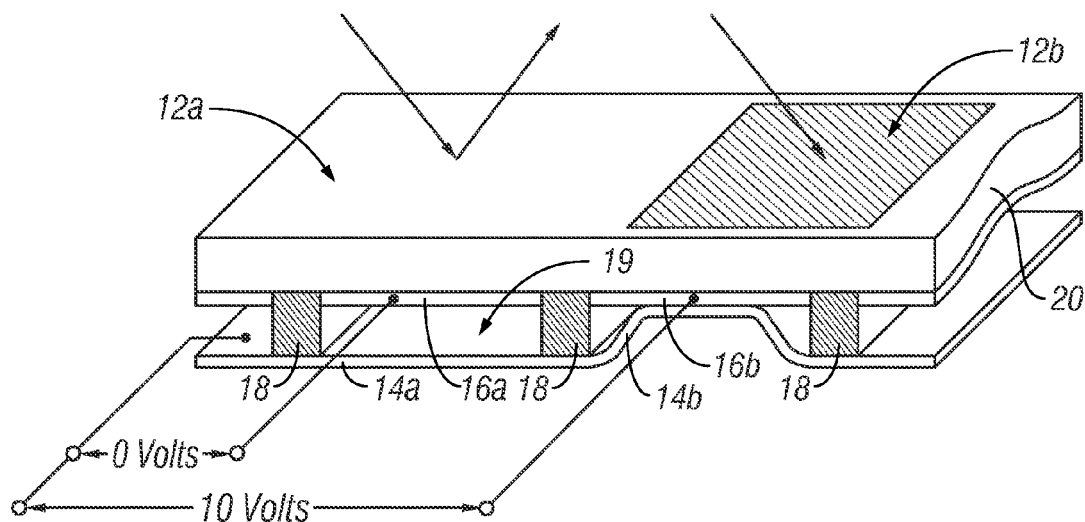
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects (or transmit) a large portion of incident visible light to a user. When in the dark ("off" or "closed") state, the display element reflects (or transmit) little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
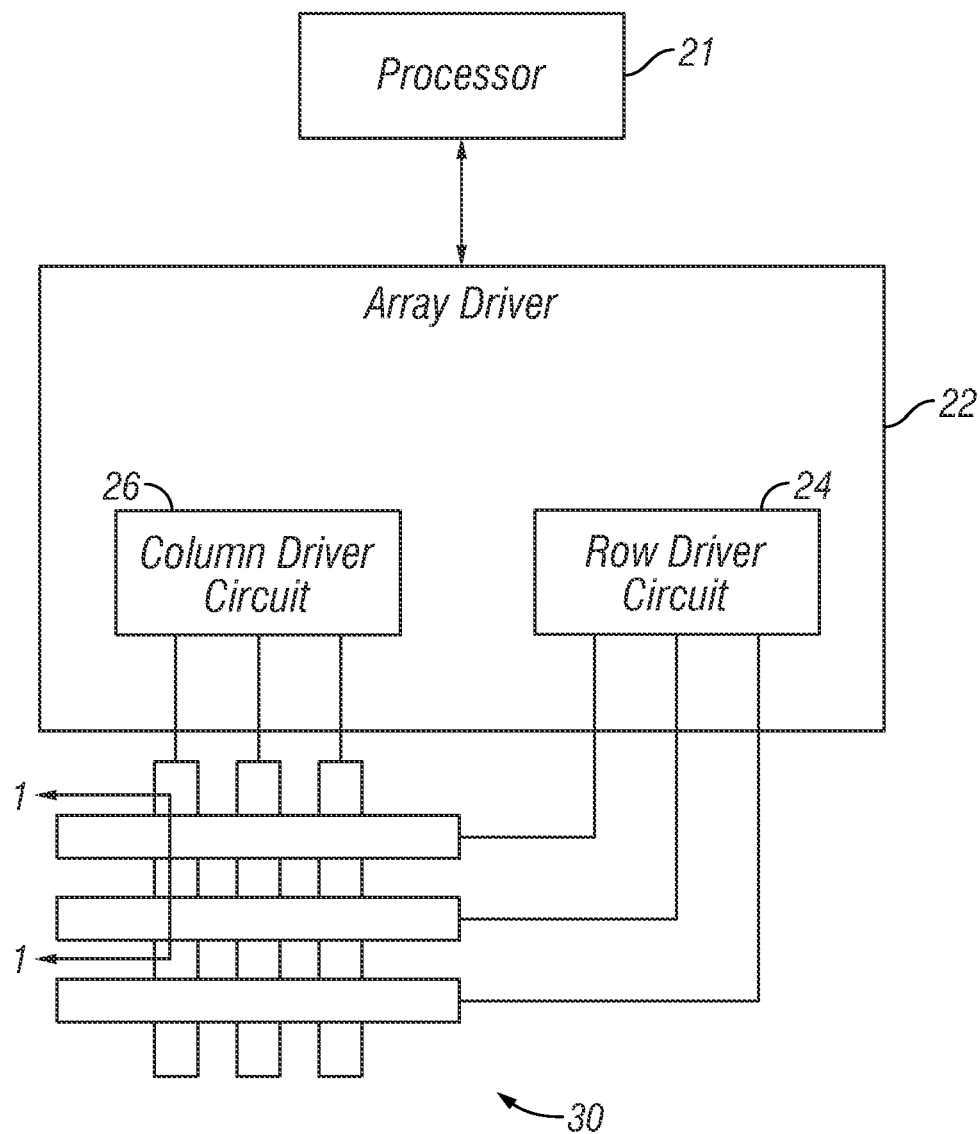
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
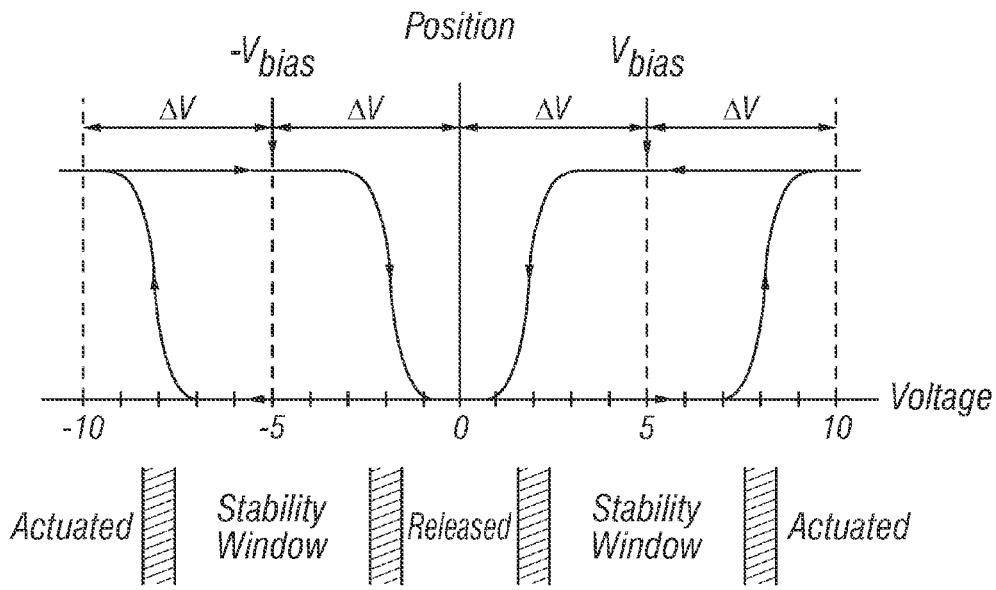
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
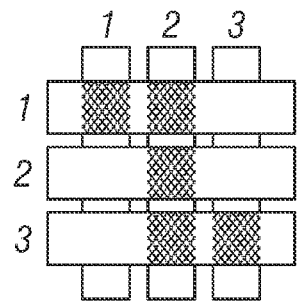
FIGS. 5A and 5B illustrate one exemplary timing diagram for row and column signals that may be used to write a frame of display data to the 3×3 interferometric modulator display of FIG. 2.
Figure 5B:
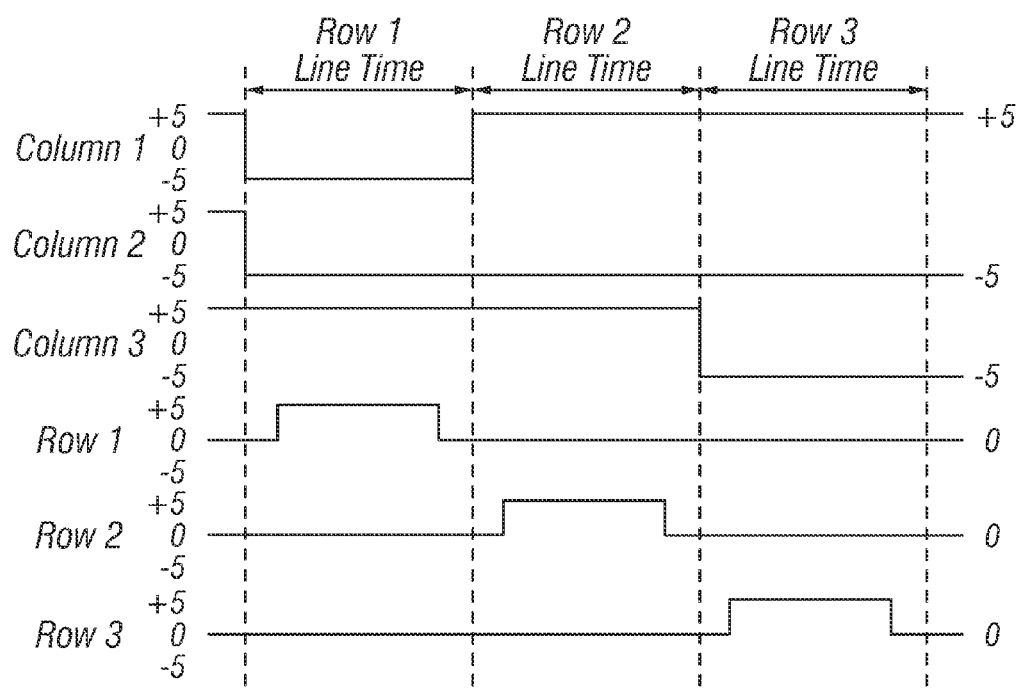

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
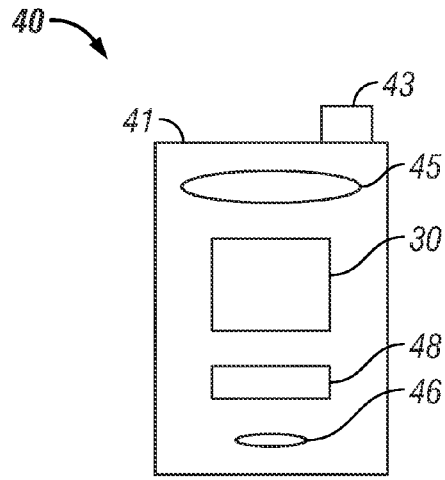
FIGS. 6A and 6B are system block diagrams illustrating an embodiment of a visual display device comprising a plurality of interferometric modulators.
Figure 6B:
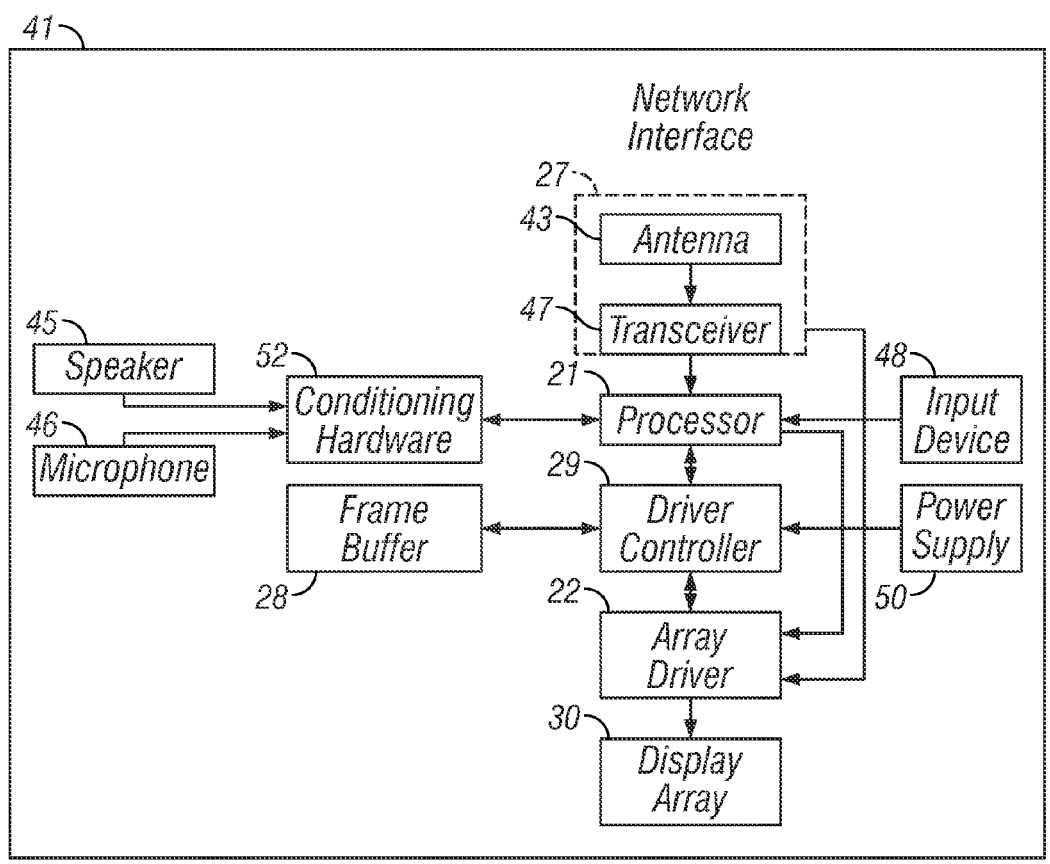

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
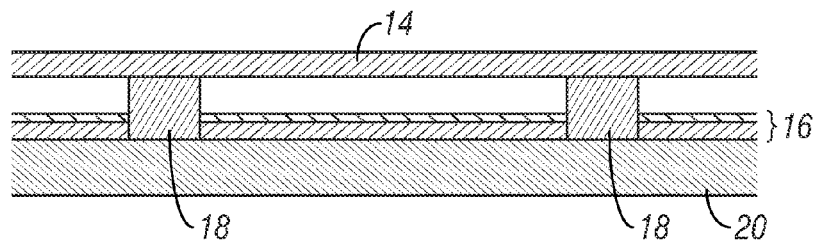
FIG. 7A is a cross section of the device of FIG. 1.
Figure 7B:
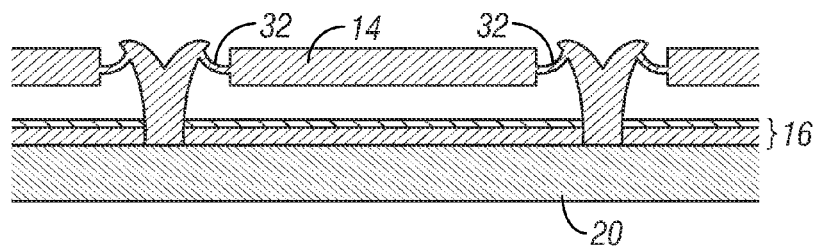
FIG. 7B is a cross section of an alternative embodiment of an interferometric modulator.
Figure 7C:
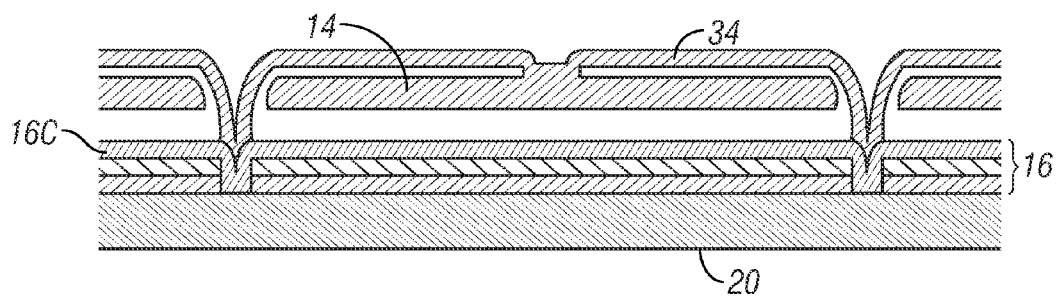
FIG. 7C is a cross section of another alternative embodiment of an interferometric modulator.
Figure 7D:
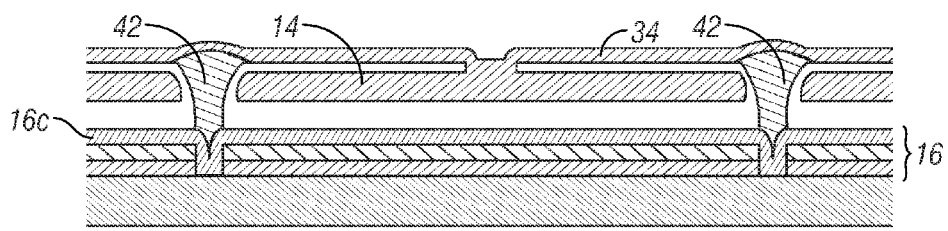
FIG. 7D is a cross section of yet another alternative embodiment of an interferometric modulator.
Figure 7E:
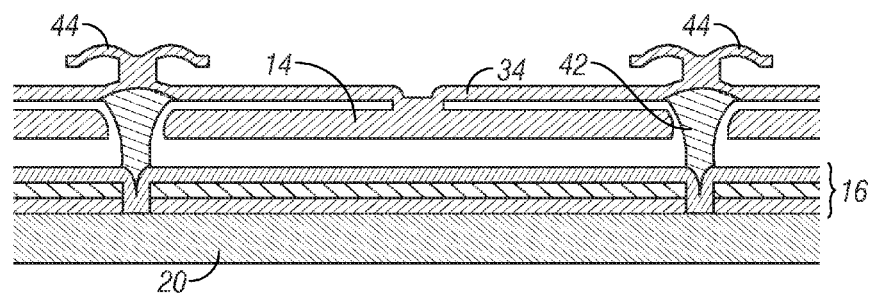
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
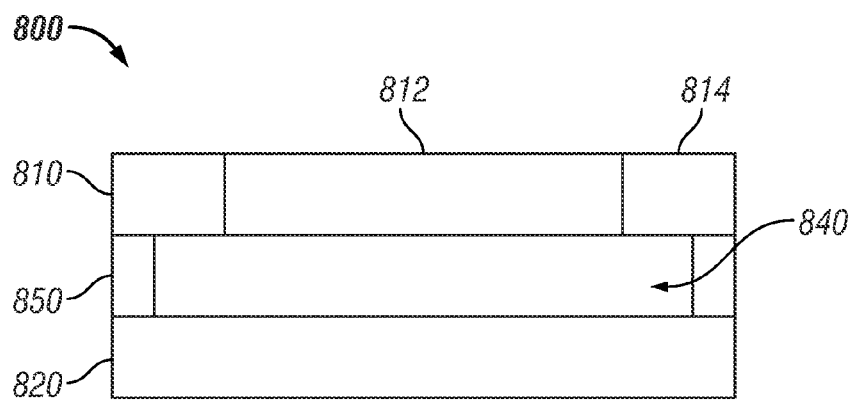
FIG. 8A is a cross section of a sensor including a hermetically sealed cell according to one embodiment.

FIG. 8A is a cross section of a sensor 800 including a hermetically sealed cell according to one embodiment. The hermetically sealed cell can be formed on a substrate, which can be made of glass, plastic, metal, semiconductors, or other suitable materials for supporting one or more cells. The sensor 800 includes a first layer 810 and a second layer 820 coupled together by a spacer 850 which surrounds a cavity 840 between the first layer 810 and the second layer 820. Although the spacer 850 is only shown in two places in the cross section of FIG. 8A, it is to be appreciated that the spacer 850 forms a closed shape between the first layer 810 and second layer 820. The first layer 810, second layer 820, and spacer 850 define a hermetically sealed cell about the cavity 840. Thus, the interior of the cavity 840 is separate and not in fluid communication with the air outside of the cavity 840. The cavity 840 may be filled with a vacuum, air, helium, argon, xenon, or some other gas or combination of gases.

In one embodiment, the first layer 810 is at least partially reflective and partially transmissive and the second layer 820 is at least partially reflective. Thus, the cavity 840 can function as an interferometric cavity. In one embodiment, the cell inferometrically modulates at least one visible wavelength of light. In a particularly embodiment, the gap distance between the first and second layers is less than 3 mm, less than 2 mm, or less than 1 mm. The reflective properties of the sensor 800 depend, at least in part, on the gap distance between the first layer 810 and the second layer 820. In one embodiment, the sensor reflects different wavelengths of light depending on the gap distance. Thus, the sensor appears as a different color depending on the gap distance.

Figure 8B:
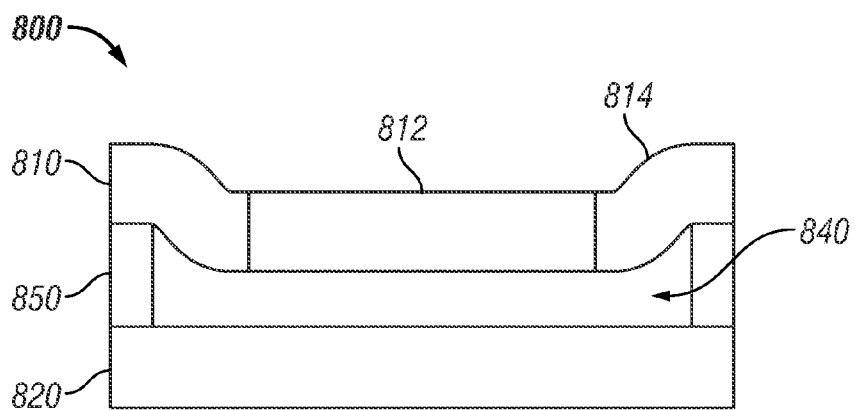
FIG. 8B is a cross section of the sensor of FIG. 8A exposed to increased pressure.

FIG. 8B is a cross section of the sensor 800 of FIG. 8A exposed to increased pressure. In FIG. 8B, the sensor 800 is exposed to a pressure which is greater than the pressure to which the sensor 800 in FIG. 8A is exposed. In response to the increased pressure, the cavity 840 decreases volume to equalize the pressure inside and outside of the cavity 840. Because the cavity 840 is hermetically sealed, the amount of air inside the cavity is fixed. Thus, as the volume of the cavity 840 decreases, the pressure increases in accordance with the ideal gas law.

In one embodiment, the first layer 810 is at least partially flexible and moves towards the second layer 820, which is rigid. The first layer 810 may comprise a flexible portion 814 towards the periphery of the sensor, and a rigid portion 812 towards the center, such that the rigid portion 812 is substantially parallel with the second layer 820. In another embodiment, the second layer 820 is at least partially flexible and moves towards the first layer 810.

As the first layer 810 and second layer 820 move closer together, the gap distance is decreased and the reflective properties of the sensor 800 change. In particular, as the gap distance is decreased, the sensor 800 reflects shorter wavelengths of light. Thus, the color of the sensor 800 changes. For example, in one embodiment, the sensor 800 reflects predominantly yellow light at neutral pressure and reflects predominantly green light at increased pressure.

Figure 8C:
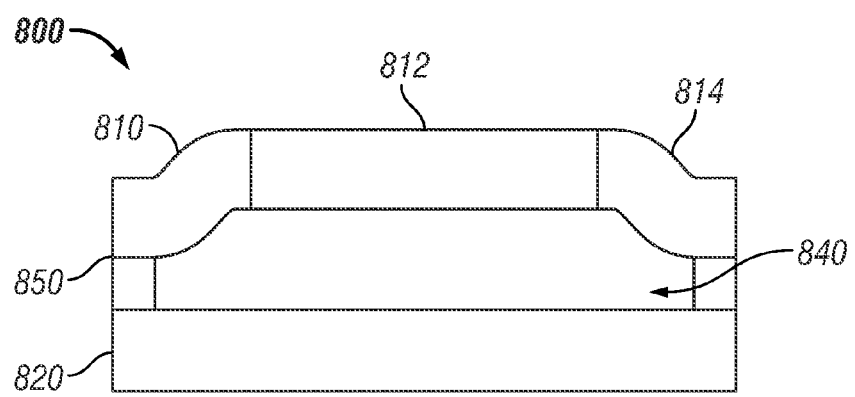
FIG. 8C is a cross section of the sensor of FIG. 8A exposed to decreased pressure.

FIG. 8C is a cross section of the sensor 800 of FIG. 8A exposed to decreased pressure. In FIG. 8C, the sensor 800 is exposed to a pressure which is less than the pressure to which the sensor 800 in FIG. 8A is exposed. In response to the decreased pressure, the cavity 840 increases volume to equalize the pressure inside and outside of the cavity 840. As the first layer 810 and second layer 820 move further apart, the gap distance is increased and the reflective properties of the sensor 800 change. In particular, as the gap distance is increased, the sensor 800 reflects longer wavelengths of light. Thus, the color of the sensor 800 changes. For example, in one embodiment, the sensor 800 reflects predominantly yellow light at neutral pressure and reflects predominantly red light at decreased pressure.

As mentioned above, the wavelength of light reflected by the sensor 800 is dependent on the gap distance between the first layer 810 and the second layer 820. The gap distance is dependent on the volume of the cavity 840 between the first layer 810 and the second layer 820 and further, the volume of the cavity 840 is dependent on the pressure within the cavity 840. However, the wavelength of light reflected by the sensor 800 is not only dependent on the pressure within the cavity 840, but also the configuration of the cell. For example, at a constant pressure, an increase in volume at the periphery of the cell results in a decrease in volume towards the center of the cell. Thus, in one embodiment, the size of the spacer 850 is adjustable. By increasing the height of the spacer 850, the volume at the periphery of the cell is increased and, thus, the volume at the center of the cell decreases by, e.g., motion of the rigid portion 812 of the first layer 810 towards the second layer 820. Accordingly, an adjustable spacer 850 allows a user to preset a particular color with a particular pressure. When the pressure about the sensor 800 increases, the rigid portion 812 of the first layer 810 moves closer still towards the second layer 820, resulting in the reflection of light of a shorter wavelength. In one embodiment, the spacer 850 includes a threaded top portion which twists on a matchingly threaded bottom portion. The threads may be fine, allowing adjustments of the size of the spacer 850 on the order of nanometers.

Figure 9A:
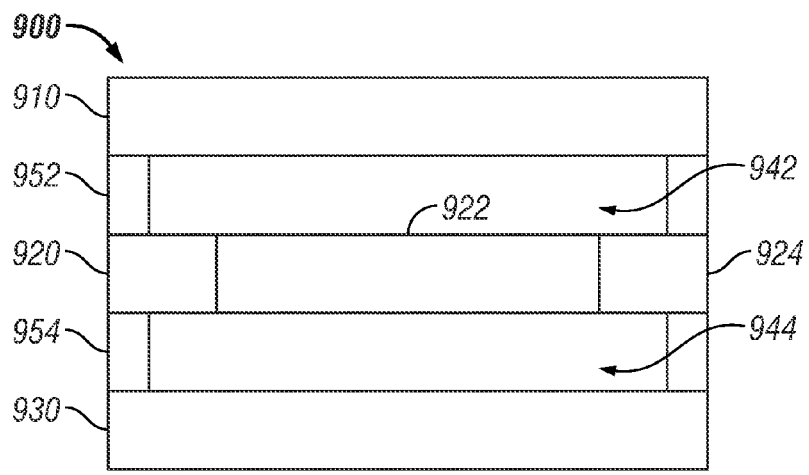
FIG. 9A is a cross section of a sensor including a hermetically sealed cell according to another embodiment.

FIG. 9A is a cross section of a sensor 900 including a hermetically sealed cell according to another embodiment. The sensor 900 includes a first layer 910, a second layer 920, and a third layer 930. The first layer 910 and second layer 920 are coupled together by a first spacer 952 defining a first cavity 942 between the first layer 910 and the second layer 920. The second layer 920 and third layer 930 are coupled together by a second spacer 954 which surrounds a second cavity 944 between the second layer 920 and the third layer 930. The first spacer 952 may be permeable, such that the first cavity 942 between the first layer 910 and second layer 920 is not hermetically sealed. Although the second spacer 954 is only shown in two places in the cross section of FIG. 9A, it is to be appreciated that the second spacer 954 forms a closed shape between the second layer 920 and third layer 930. The second layer 920, third layer 930, and second spacer 954 define a hermetically sealed cell about the second cavity 944. Thus, the air within the second cavity 944 is separate and not in fluid communication with the air outside of the second cavity 944.

In one embodiment, the first layer 910 is at least partially reflective and partially transmissive and the second layer 920 is at least partially reflective. Thus, the first cavity 942 can function as an interferometric cavity. However, it is not necessarily a hermetically sealed interferometric cavity as is the cavity 840 of FIG. 8A. The reflective properties of the sensor 900 depend, at least in part, on the gap distance between the first layer 910 and the second layer 920. In one embodiment, the sensor 900 reflects different wavelengths of light depending on the gap distance. Thus, the sensor 900 appears as a different color depending on the gap distance.

Figure 9B:
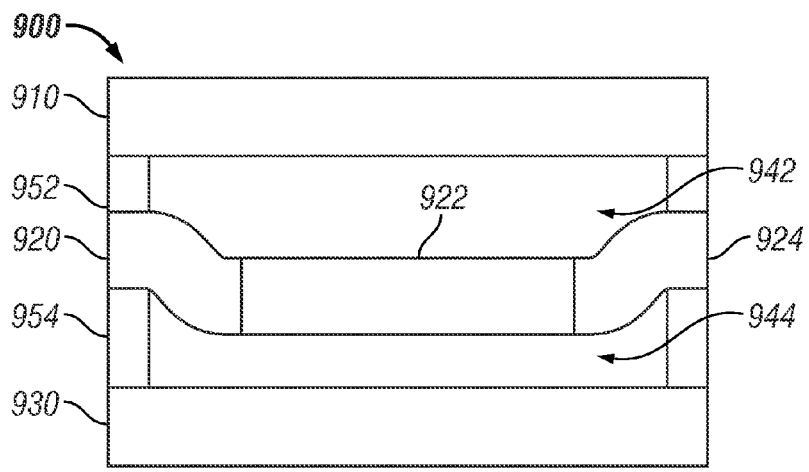
FIG. 9B is a cross section of the sensor of FIG. 9A exposed to increased pressure.

FIG. 9B is a cross section of the sensor 900 of FIG. 9A exposed to increased pressure. In FIG. 9B, the sensor 900 is exposed to a pressure which is greater than the pressure to which the sensor 900 in FIG. 9A is exposed. The pressure in the first cavity 942, which is not hermetically sealed, is equal to the pressure about the sensor 900 without any motion of the layers. However, because the second cavity 944 is hermetically sealed, in order to equalize the pressure in the first cavity 942 and the second cavity 944, the second cavity 944 decreases volume. Because the second cavity 944 is hermetically sealed, the amount of air inside the cavity is fixed. Thus, as the volume of the cavity 944 decreases, the pressure increases in accordance with the ideal gas law, thereby equalizing the pressure.

In one embodiment, the second layer 920 is at least partially flexible and moves towards the third layer 930, which is rigid. The second layer 920 may comprise a flexible portion 924 towards the periphery of the sensor, and a rigid portion 922 towards the center, such that the rigid portion 922 is substantially parallel with the first layer 910.

As the second layer 920 moves further away from the first layer 910, the gap distance of the first cavity 942 is increased and the reflective properties of the sensor 900 change. In particular, as the gap distance is increased, the sensor 900 reflects longer wavelengths of light. Thus, the color of the sensor 900 changes. For example, in one embodiment, the sensor 900 reflects predominantly yellow light at neutral pressure and reflects predominantly red light at increased pressure. Thus, the sensor 900 reflects longer wavelengths of light at increased pressure. In comparison, the sensor 800 of FIG. 8A reflects shorter wavelengths of light at increased pressure.

Figure 9C:
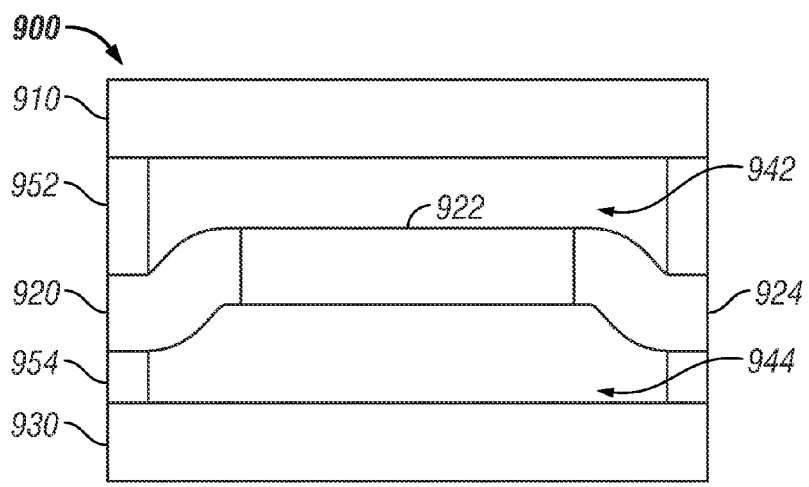
FIG. 9C is a cross section of the sensor of FIG. 9A exposed to decreased pressure.

FIG. 9C is a cross section of the sensor 900 of FIG. 9A exposed to decreased pressure. In FIG. 9C, the sensor 900 is exposed to a pressure which is less than the pressure to which the sensor 900 in FIG. 9A is exposed. As described above with respect to FIG. 9B, the pressure in the first cavity 942, which is not hermetically sealed, is equal to the pressure about the sensor 900 without any motion of the layers. However, because the second cavity 944 is hermetically sealed, in order to equalize the pressure in the first cavity 942 and the second cavity 944, the second cavity 944 increases volume. As the second layer 920 moves closer to the first layer 910, the gap distance of the first cavity 942 is decreased and the reflective properties of the sensor 900 change. In particular, as the gap distance is decreased, the sensor 900 reflects shorter wavelengths of light. Thus, the color of the sensor 900 changes. For example, in one embodiment, the sensor 900 reflects predominantly yellow light at neutral pressure and reflects predominantly green light at decreased pressure. Thus, the sensor 900 reflects shorter wavelengths of light at decreased pressure. In comparison, the sensor 800 of FIG. 8A reflects longer wavelengths of light at decreased pressure.

Figure 10:
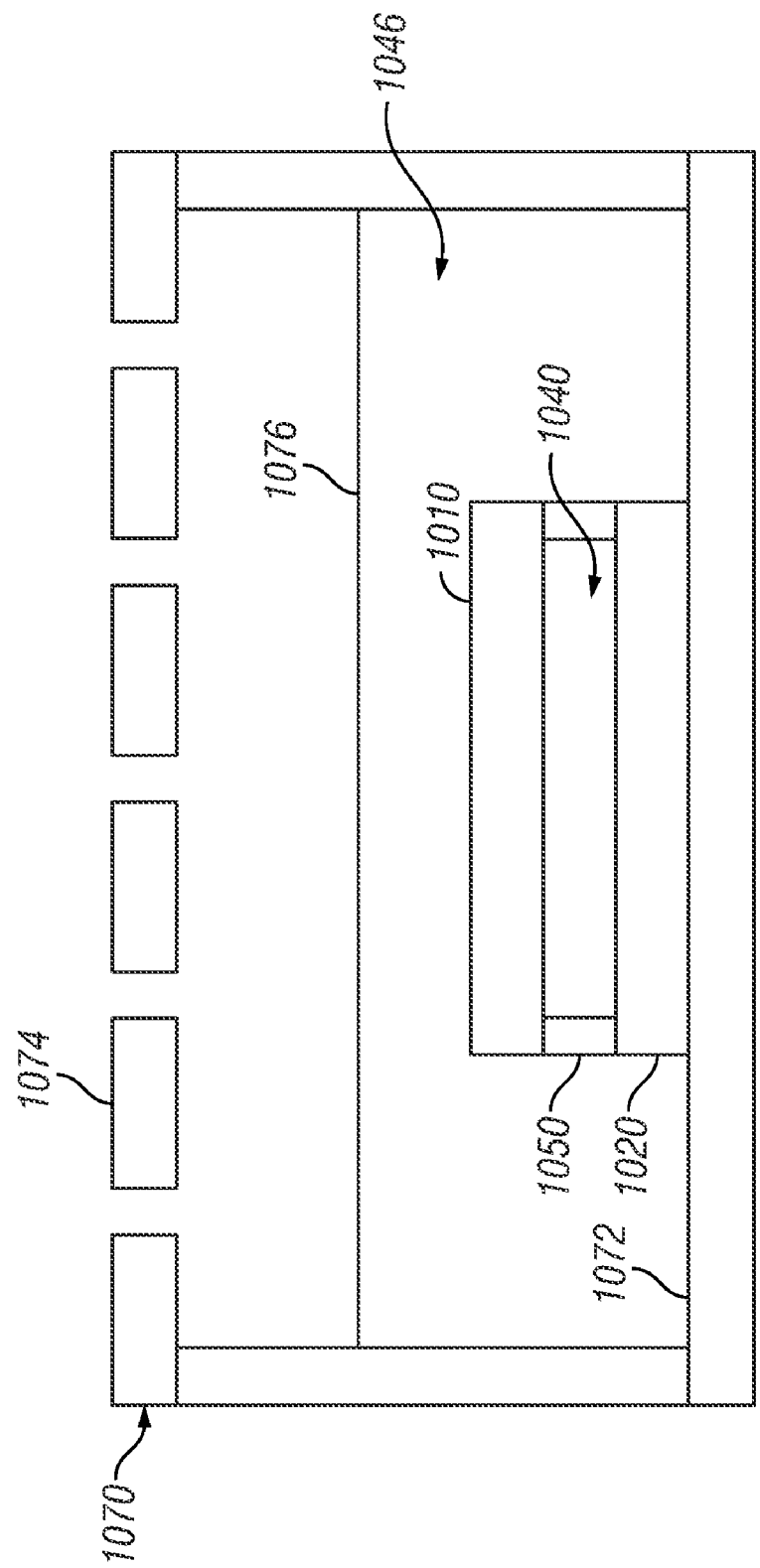
FIG. 10 is a cross section of a sensor including a hermetically sealed cell within a package.

FIG. 10 is a cross section of a sensor 1000 including a hermetically sealed cell within a package 1070. The sensor 1000 includes a hermetically sealed cell defined, at least in part, by a first layer 1010 and a second layer 1020 coupled together by a spacer 1050 which surrounds an interferometric cavity 1040 between the first layer 1010 and the second layer 1020. In another embodiment, the sensor 1000 includes an inverse-type interferometric modulator such as that illustrated and described above with respect to FIG. 9A. Although only one cell is illustrated in FIG. 10, in one embodiment, the package houses multiple cells. In one embodiment, the package houses a two-dimensional array of cells.

The cell is surrounded by a package 1070 which protects the cell and includes a front plate 1072 and a back plate 1074. In one embodiment, the front plate 1072 is a glass substrate. In one embodiment, the back plate 1074 is porous. Thus, the back plate 1074 can be air-permeable, water-permeable, or both.

When pressure about the sensor 1000 increases, the pressure in the area within the package 1070 and outside of the interferometric cavity 1040 equalizes as air permeates the back plate 1074 through the pores. The pressure inside the interferometric cavity 1040 is equalized by motion of the first layer 1040 towards the second layer 1020.

In one embodiment, the package 1070 includes a membrane 1076 between the front plate 1072 and the back plate 1074. The membrane 1076 is impermeable to air and water. The membrane 1076 seals the hermetically sealed cell in an outer cavity 1046. The membrane 1076 may be particularly useful when the sensor 1000 is used to determine water pressure, as the membrane 1076 is exposed to water, which permeates the pores of the back plate 1074, but the hermetically sealed cell is not. When water pressure about the sensor 1000 increases, the water pressure in the area between the back plate 1074 and the membrane 1076 equalizes as water permeates the back plate 1074 through the pores. The air pressure inside the outer cavity 1046 is equalized by motion of the membrane 1076 towards the front plate 1072. The air pressure inside the interferometric cavity 1040 is similarly equalized by motion of the first layer 1010 towards the second layer 1020.

The membrane 1076 can also be used to provide a lower limit on the pressure in the outer cavity 1046. As pressure about the sensor 1000 is decreased, the pressure in the area between the back plate 1074 and the membrane 1076 equalizes as air or water permeates the back plate 1074 through the pores. The air pressure inside the outer cavity 1046 is equalized by motion of the membrane 1076 towards the back plate 1072, thereby increasing the volume of the outer cavity 1046 and decreasing the pressure within the outer cavity 1046. Once the membrane reaches the back plate 1074, the volume of the outer cavity 1046 can expand no further, and thus, the pressure within the outer cavity 1046 can decrease no further. The pressure inside the interferometric cavity 1040 is equalized to the pressure in the outer cavity 1046 by motion of the first layer 1010 away from second layer 1020.

In one embodiment, the package 1070 includes a porous midplate (not shown) between the membrane 1076 and the first layer 1010 to provide an upper limit on the pressure in the outer cavity 1046.

Figure 11A:
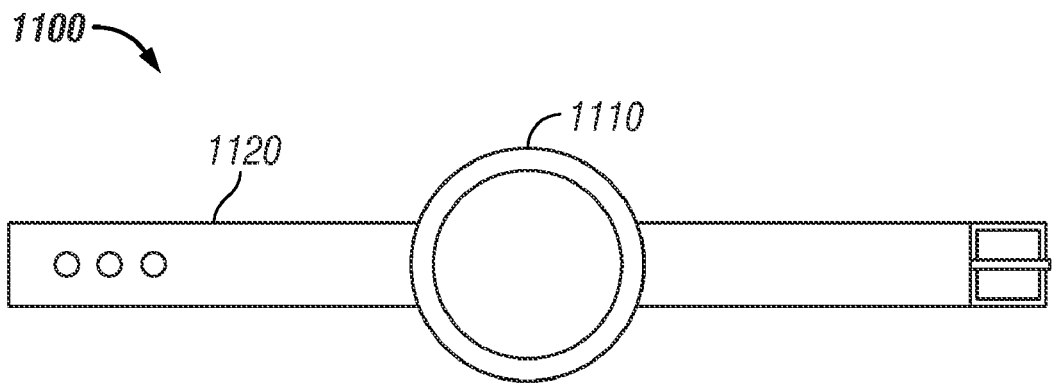
FIG. 11A is a front view of a diving watch incorporating a pressure sensor.

FIG. 11A is a front view of a diving watch 1100 incorporating a pressure sensor. The diving watch 1100 includes a display piece 1110 and a strap 1120. At least a portion of the display piece 1110 comprises a pressure sensor 1112 including a substrate and a porous back plate which is positioned towards the front of the device. The pressure sensor 1112 is exposed to water when a user is submerged and is viewable by the user. Between the substrate and the back plate is a membrane sealing an outer cavity. Within the outer cavity is an inverse-type interferometric modulator such as sensor 900 described above with respect to FIG. 9A, such that as the user descends to lower depths, the reflected wavelength of light changes from green to red. In another embodiment, an interferometric modulator such as sensor 800 described above with respect to FIG. 8A is within the package.

Figure 11B:
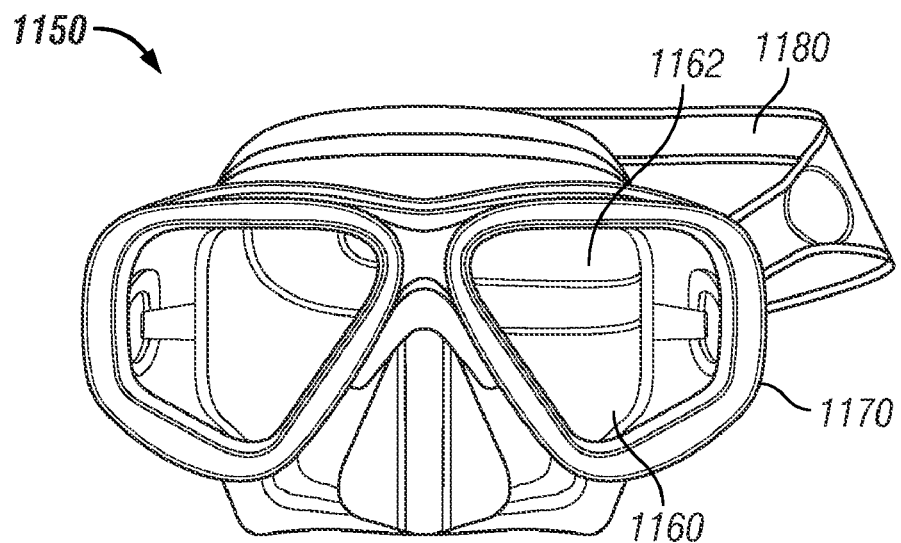
FIG. 11B is a front view of a diving mask incorporating a pressure sensor.

FIG. 11B is a front view of a diving mask 1150 incorporating a pressure sensor. The diving mask 1150 includes a viewing window 1160, a housing 1170 and a strap 1180. At least a portion of the viewing window comprises a pressure sensor 1162 including a substrate and a porous back plate which is positioned toward the front of the device. The back plate is exposed to water when the user is submerged and the substrate is viewable by the user. Between the substrate and the back plate is a membrane sealing an outer cavity. Within the outer cavity and is an inverse-type interferometric modulator such as sensor 900 described above with respect to FIG. 9A having a partially reflective and partially transmissive first layer, a partially reflective second layer, and a third layer. In one embodiment, the second layer, third layer, back plate, and substrate are also at least partially transmissive. Thus, as light passes through the back plate, it is interferometrically modulated by the sensor before it passes through the substrate to the user's eyes.

Figure 12:
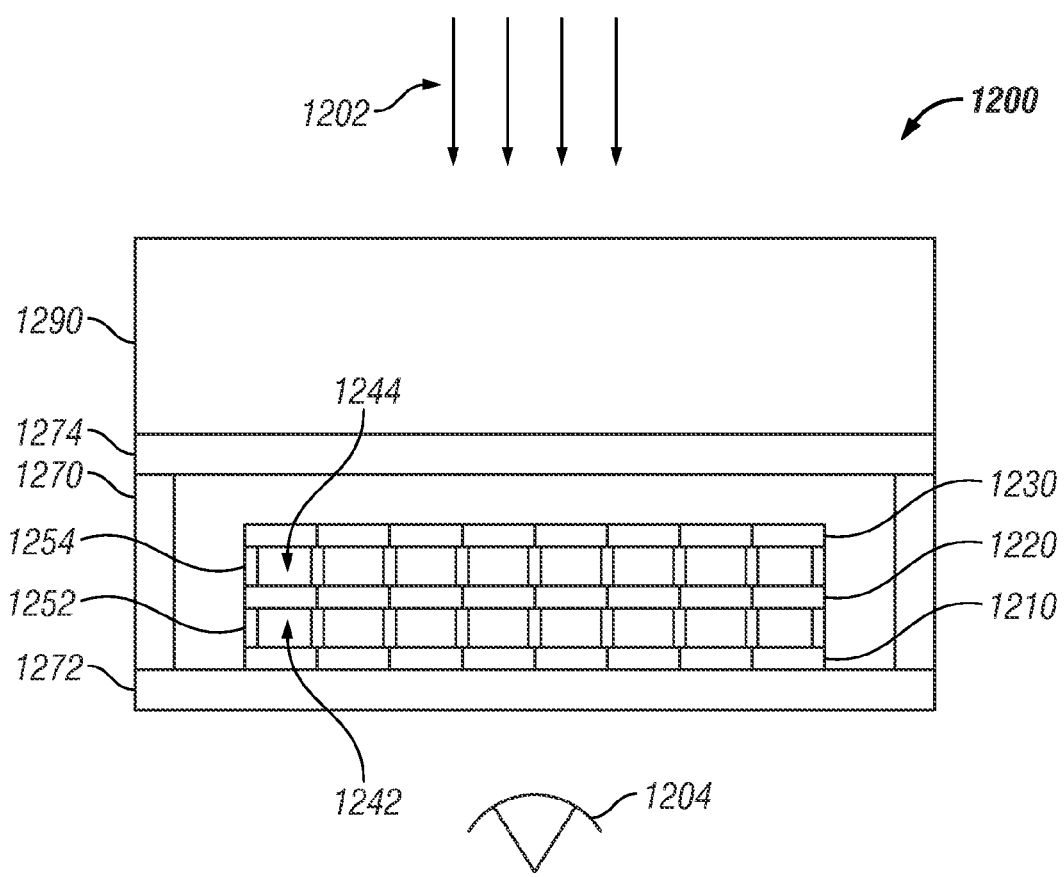
FIG. 12 is a cross section of an infrared radiation sensor and false-color imaging display.

FIG. 12 is a cross section of an infrared radiation sensor and false-color imaging display 1200. The display 1200 includes a packaging 1270 including a front plate 1272 and a back plate 1274. Within the packaging 1270 is a two-dimensional array of infrared radiation sensors 1201. Each sensor 1201 includes a first layer 1210, a second layer 1220, and a third layer 1230. The first layer 1210 and second layer 1220 are coupled together by a first spacer 1252 defining a first cavity 1242 between the first layer 1210 and the second layer 1220. The second layer 1220 and third layer 1230 are coupled together by a second spacer 1254 which surrounds a second cavity 1244 between the second layer 1220 and the third layer 1230. The first spacer 1252 may be permeable, such that the first cavity 1242 between the first layer 1210 and second layer 1220 is not hermetically sealed. In another embodiment, the first spacer 1242 hermetically seals the first cavity. Although the second spacer 1254 is only shown in two places per sensor 1201 in the cross section of FIG. 12, it is to be appreciated that the second spacer 1254 forms a closed shape for each sensor 1201 between the second layer 1220 and third layer 1230. The second layer 1220, third layer 1230, and second spacer 1254 define a hermetically sealed cell about the second cavity 1244. Thus, the air within the second cavity 1244 is separate and not in fluid communication with the air outside of the second cavity 1240.

In one embodiment, the first layer 1210 is at least partially reflective and partially transmissive and the second layer 1220 is at least partially reflective. Thus, the first cavity 1242 can function as an interferometric cavity. As described above, the reflective properties of each the sensors 1201 depend, at least in part, on the gap distance between the first layer 1210 and the second layer 1220. In one embodiment, each sensor 1201 reflects different wavelengths of light depending on the gap distance. Thus, each sensor 1201 appears as a different color depending on the gap distance.

In the embodiment illustrated in FIG. 12, the first layer 1210 of each sensor 1201 is attached to the front plate 1272. In another embodiment, the third layer 1230 is attached to the back plate 1274 and the first layer 1210 is not attached to the front plate 1272.

In one embodiment, the third layer 1230 is an infrared absorber. The display 1200 includes an infrared optical imaging system 1290 configured to image an infrared scene 1202 onto the third layers 1230 of the sensors 1201. This causes the second cavity 1244 of each sensor 1201 to be heated to an extent determined by the intensity of the infrared radiation imaged onto that particular sensor 1201 by the optical imaging system 1290. As the air inside the second cavity 1244 is heated, the volume of the second cavity 1244 is increased in accordance with the ideal gas law. This increase in volume of the second cavity 1244 results in a decrease in volume of the first cavity 1242. Thus, the second layer 1220 is moved towards the first layer 1210, changing the gap distance and changing the reflective properties of the sensor 1201. Because the reflective properties of each sensor 1201 are changed in accordance with the amount of infrared radiation imaged onto the sensor 1201 by the optical imaging system 1290, the two-dimension array of sensors 1201 will display a false-color image to a user 1204 by differentially reflecting incident light.

As described above, in one embodiment, the display 1200 includes an infrared optical imaging system 1290, which may include one or more mirrors or lenses. In another embodiment, the third layer 1230 is exposed. The third layer may be placed and moved along a surface such that the display 1200 reveals "hot spots" as a false-color image.

The display 1200 can include heat removal channels to extract heat from the sensors 1201 at a steady rate so that the image will refresh. In one embodiment, the spacers 1252, 1254 are thermally conductive and conduct heat from the third layer 1230 to the front plate 1272. One or more heat sinks, such as a thermally conductive grid, can be provided on the front plate 1272.

Figure 13A:
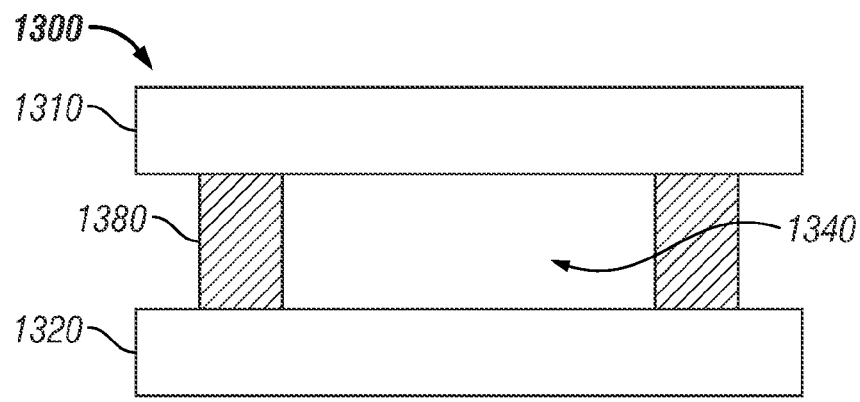
FIG. 13A is cross section of a sensor including a scaling material according to one embodiment.

FIG. 13A is cross section of a sensor 1300 including a scaling material 1380 according to one embodiment. The sensor 1300 includes a first layer 1310 and a second layer 1320 separated by a scaling material 1380. In one embodiment, the first layer 1310 is at least partially reflective and partially transmissive and the second layer 1320 is at least partially reflective, thereby defining an interferometric cavity 1340 between the first layer 1310 and the second layer 1320. Unlike the sensor 800 in FIG. 8A, the interferometric cavity 1340 is not necessarily hermetically sealed.

The scaling material 1380 changes size, e.g. expands or contracts, depending on environmental parameters of the environment to which the scaling material is exposed. For example, the scaling material 1380 may expand as temperature increases and contract as temperature decreases. As another example, the scaling material 1380 may expand as humidity increases and contract as humidity decreases. As another example, the scaling material 1380 may expand as pressure decreases and contract as pressure increases. As another example, the scaling material 1380 may expand as the concentration of a particular gas, such as $O_2$, $N_2$, $SO$, $NO_3$, $CO$, or $CO_2$, increases and contract as the concentration of the particular gas decreases. As another example, the scaling material 1380 may expand as radiation increases and contract as radiation decreases. Some, but not all, suitable scaling materials 1380 are described below following the discussion of FIG. 15C.

Figure 13B:
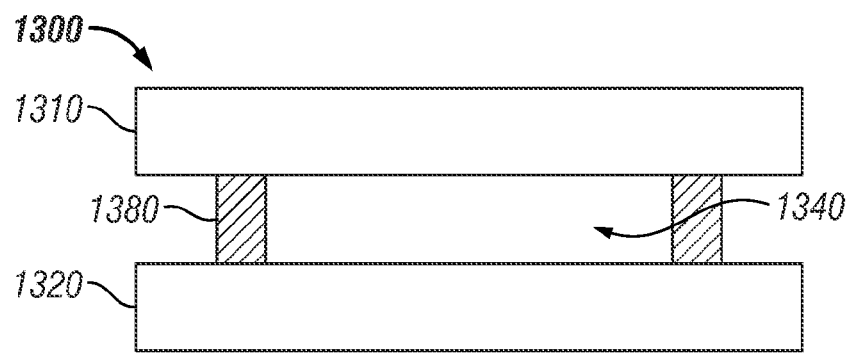
FIG. 13B is a cross section of the sensor of FIG. 13A exposed to an environment having an environmental parameter which decreases the size of the scaling material.

FIG. 13B is a cross section of the sensor 1300 of FIG. 13A exposed to an environment having an environmental parameter which decreases the size of the scaling material 1380. In FIG. 8B, the sensor 1300 is exposed to an environment having an environmental parameter of a value which decreases the size of the scaling material 1380 as compared to FIG. 13A. As the first layer 1310 and second layer 1320 move closer together, the gap distance is decreased and the reflective properties of the sensor 1300 change. In particular, as the gap distance is decreased, the sensor 1300 reflects shorter wavelengths of light. Thus, the color of the sensor 1300 changes. For example, in one embodiment, the sensor 1300 reflects predominantly yellow light when exposed to an environment having an environmental parameter of a first value and reflects predominantly green light when exposed to an environment having an environmental parameter of a second value.

Figure 13C:
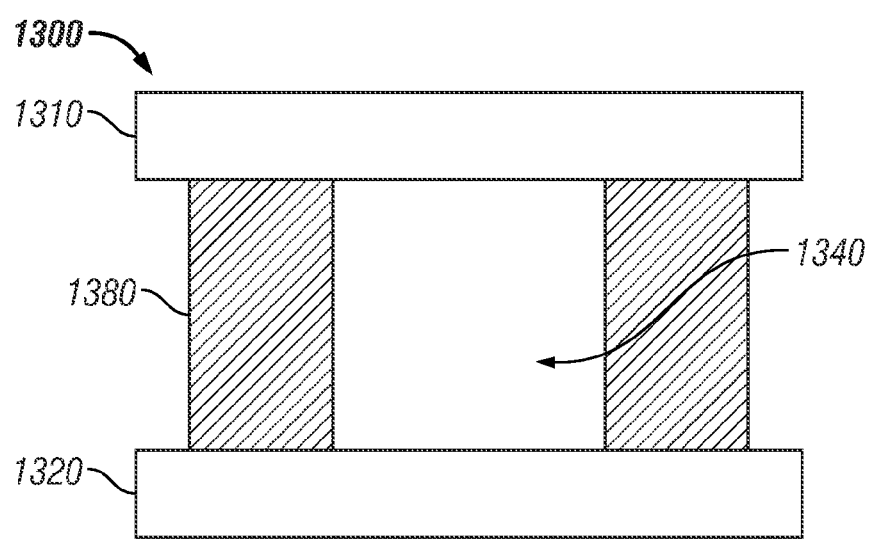
FIG. 13C is a cross section of the sensor of FIG. 13A exposed to an environment having an environmental parameter which increases the size of the scaling material.

FIG. 13C is a cross section of the sensor 1300 of FIG. 13A exposed to an environment having an environmental parameter which increases the size of the scaling material 1380. In FIG. 13C, the sensor 1300 is exposed to an environment having an environmental parameter of a value which increases the size of the scaling material 1380 as compared to FIG. 13A. As the first layer 1310 and second layer 1320 move further apart, the gap distance is increased and the reflective properties of the sensor 1300 change. In particular, as the gap distance is increased, the sensor 1300 reflects longer wavelengths of light. Thus, the color of the sensor 1300 changes. For example, in one embodiment, the sensor 1300 reflects predominantly yellow light when exposed to an environment having an environmental parameter of first value and reflects predominantly red light when exposed to an environment having an environmental parameter of a second value.

Figure 14A:
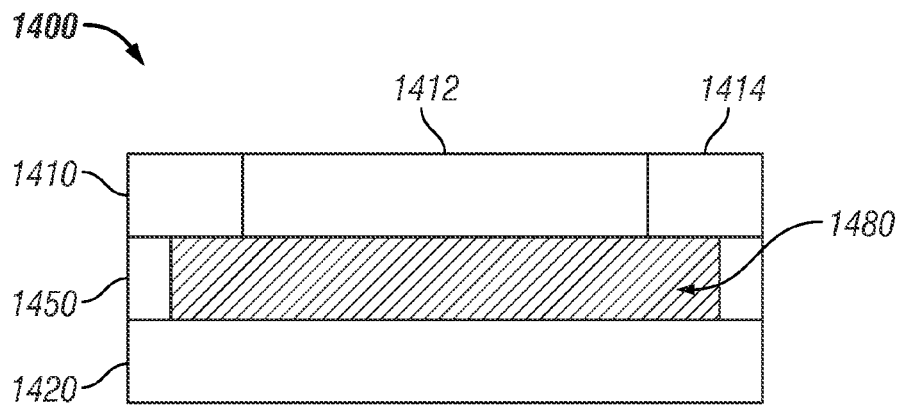
FIG. 14A is a cross section of a sensor including a transparent scaling material according to one embodiment.

FIG. 14A is a cross section of a sensor 1400 including a transparent scaling material 1480 according to one embodiment. The sensor 1400 includes a first layer 1410 and a second layer 1420 separated by a transparent scaling material 1480. In one embodiment, the scaling material 1480 is solid and couples the first layer 1410 and the second layer 1420. In another embodiment, the scaling material 1480 is a fluid, such as a gas, a liquid, or a powder, and is contained between the first layer 1410 and the second layer 1420 by a spacer 1450. In one embodiment, the first layer 1410 is at least partially reflective and partially transmissive and the second layer 1420 is at least partially reflective, thereby defining an interferometric cavity between the first layer 1410 and the second layer 1420. As mentioned above, the scaling material 1480 changes size, e.g., expands or contracts, depending on environmental parameters of the environment to which the scaling material is exposed. Some, but not all, suitable scaling materials 1480 are described below following the discussion of FIG. 15C.

Figure 14B:
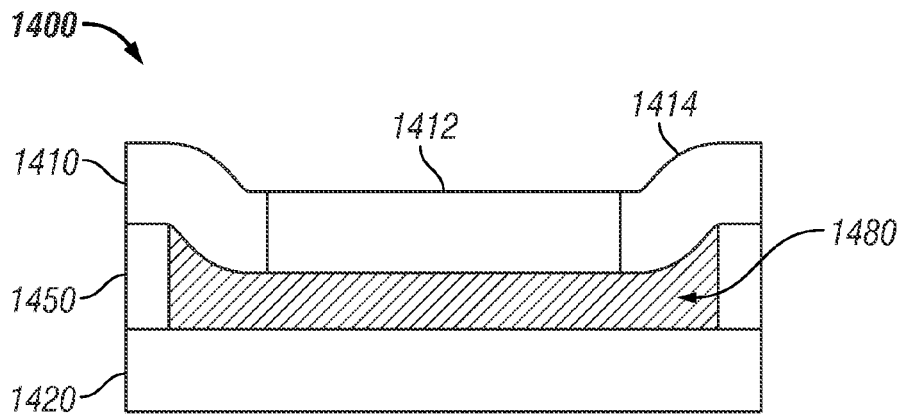
FIG. 14B is a cross section of the sensor of FIG. 14A exposed to an environment having an environmental parameter which decreases the size of the transparent scaling material.

FIG. 14B is a cross section of the sensor 1400 of FIG. 14A exposed to an environment having an environmental parameter which decreases the size of the transparent scaling material 1480. In FIG. 14B, the sensor 1400 is exposed to an environment having an environmental parameter of a value which decreases the size of the scaling material 1480 as compared to FIG. 14A. In one embodiment, the first layer 1410 is at least partially flexible and moves towards the second layer 1420, which is rigid. The first layer 1410 may comprise a flexible portion 1414 towards the periphery of the sensor, and a rigid portion 1412 towards the center, such that the rigid portion 1412 is substantially parallel with the second layer 1420. In another embodiment, the second layer 1420 is at least partially flexible and moves towards the first layer 140.

As the first layer 1410 and second layer 1420 move closer together, the gap distance is decreased and the reflective properties of the sensor 1400 change. In particular, as the gap distance is decreased, the sensor 1400 reflects shorter wavelengths of light. Thus, the color of the sensor 1400 changes. For example, in one embodiment, the sensor 1400 reflects predominantly yellow light when exposed to an environment having an environmental parameter of a first value and reflects predominantly green light when exposed to an environment having an environmental parameter of a second value.

Figure 14C:
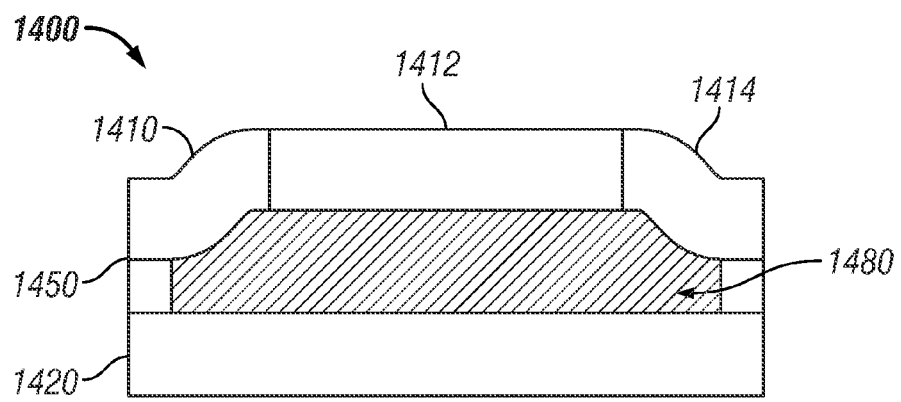
FIG. 14C is a cross section of the sensor of FIG. 14A exposed to an environment having an environmental parameter which increases the size of the transparent scaling material.

FIG. 14C is a cross section of the sensor 1400 of FIG. 14A exposed to an environment having an environmental parameter which increases the size of the transparent scaling material 1480. In FIG. 14C, the sensor 1400 is exposed to an environment having an environmental parameter of a value which increases the size of the transparent scaling material 1480 as compared to FIG. 14A. As the first layer 1410 and second layer 1420 move further apart, the gap distance is increased and the reflective properties of the sensor 1400 change. In particular, as the gap distance is increased, the sensor 1400 reflects longer wavelengths of light. Thus, the color of the sensor 1400 changes. For example, in one embodiment, the sensor 1400 reflects predominantly yellow light when exposed to an environment having an environmental parameter of a first value and reflects predominantly red light when exposed to an environment having an environmental parameter of a second value.

As mentioned above, in one embodiment, the transparent scaling material 1480 is solid and couples the first layer 1410 and the second layer 1420 and a separate spacer 1450 is unnecessary. Although in one embodiment, the first layer 1410 is partially flexible, in another embodiment, the first layer 1410 and second layer 1420 are both rigid and deposited on either side of the transparent scaling material 1480. Accordingly, the sensor is a multi-layered, monolithic slab that grows thicker or thinner depending on the environmental parameters of the environment to which the sensor is exposed. Accordingly, the resonant wavelength and the wavelength of light reflected from the sensor changes depending on the environmental parameters of the environment to which the sensor is exposed.

As described above with respect to FIG. 14A, in one embodiment, the scaling material 1480 changes size, e.g. expands or contracts, depending on environmental parameters of the environment to which the scaling material is exposed. In another embodiment of a sensor 1400, the scaling material 1480 is replaced with a material for which the speed of light in the material changes depending on the environmental parameters of the environment to which the scaling material is exposed.

Figure 15A:
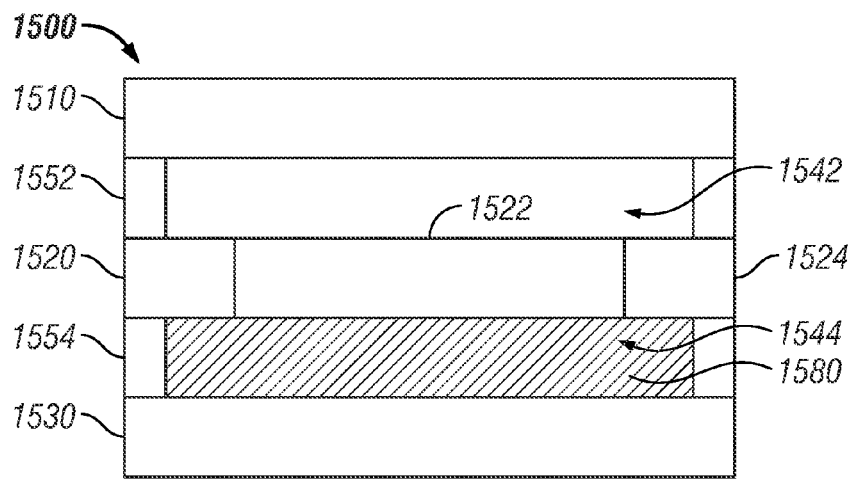
FIG. 15A is a cross section of a sensor including a scaling material according to another embodiment.

FIG. 15A is a cross section of a sensor 1500 including a scaling material 1580 according to another embodiment. Unlike the scaling material 1480 in FIG. 14A, the scaling material 1580 of the sensor 1500 is not necessarily transparent. The sensor 1500 includes a first layer 1510, a second layer 1520, and a third layer 1530. The first layer 1510 and second layer 1520 are coupled together by a first spacer 1552 defining a first cavity 1542 between the first layer 1510 and the second layer 1520. In one embodiment, the second layer 1520 and third layer 1530 are coupled together by a second spacer 1554 which surrounds a second cavity 1544 between the second layer 1520 and the third layer 1530 filed with a scaling material 1580. In another embodiment, the scaling material 1580 couples the second layer 1520 and the third layer 1530. The first spacer 1552 may be permeable, such that the first cavity 1542 between the first layer 1510 and second layer 1520 is not hermetically sealed. Although the second spacer 1554 is only shown in two places in the cross section of FIG. 15A, it is to be appreciated that the second spacer 1554 can form a closed shape between the second layer 1520 and third layer 1530 to contain the scaling material 1580.

In one embodiment, the first layer 1510 is at least partially reflective and partially transmissive and the second layer 1520 is at least partially reflective. Thus, the first cavity 1542 can function as an interferometric cavity. However, it is not necessarily a hermetically sealed interferometric cavity as is the cavity 840 of FIG. 8A. The reflective properties of the sensor 1500 depend, at least in part, on the gap distance between the first layer 1510 and the second layer 1520. In one embodiment, the sensor 1500 reflects different wavelengths of light depending on the gap distance. Thus, the sensor 1500 appears as a different color depending on the gap distance.

Figure 15B:
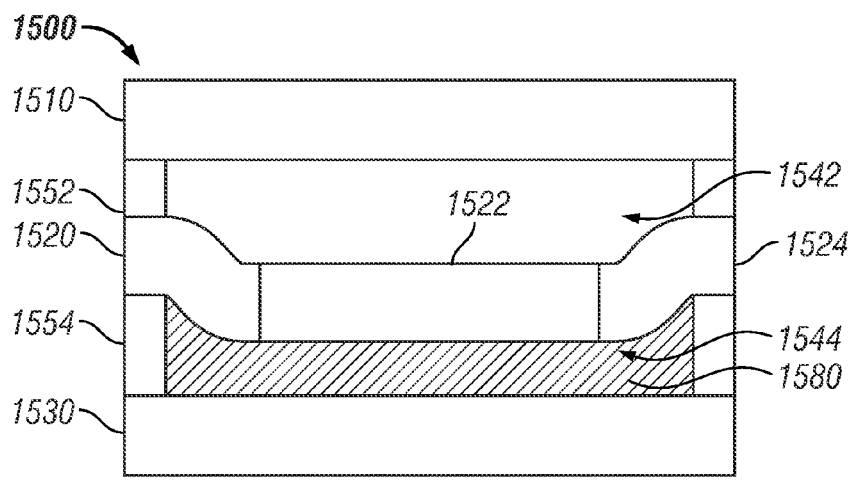
FIG. 15B is a cross section of the sensor of FIG. 15A exposed to an environment having an environmental parameter which decreases the size of the scaling material.

FIG. 15B is a cross section of the sensor 1500 of FIG. 15A exposed to an environment having an environmental parameter which decreases the size of the scaling material 1580. In FIG. 15B, the sensor 1500 is exposed to an environment having an environmental parameter of value which decreases the size of the scaling material 1580 as compared to FIG. 15A. In one embodiment, the second layer 1520 is at least partially flexible and moves towards the third layer 1530, which is rigid. The second layer 1520 may comprise a flexible portion 1524 towards the periphery of the sensor, and a rigid portion 1522 towards the center, such that the rigid portion 1522 is substantially parallel with the first layer 1510.

As the second layer 1520 moves further away from the first layer 1510, the gap distance of the first cavity 1542 is increased and the reflective properties of the sensor 1500 change. In particular, as the gap distance is increased, the sensor 1500 reflects longer wavelengths of light. Thus, the color of the sensor 1500 changes.

Figure 15C:
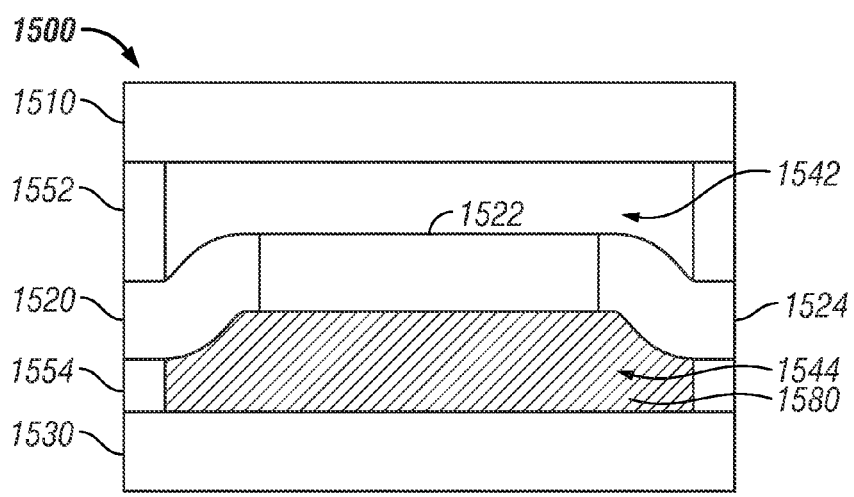
FIG. 15C is a cross section of the sensor of FIG. 15A exposed to an environment having an environmental parameter which increases the size of the scaling material.

FIG. 15C is a cross section of the sensor 1500 of FIG. 15A exposed to an environment having an environmental parameter which increases the size of the scaling material 1580. In FIG. 15C, the sensor 1500 is exposed to an environment having an environmental parameter of a value which increases the size of the transparent scaling material 1580 as compared to FIG. 15A. As the second layer 1520 moves closer to the first layer 1510, the gap distance of the first cavity 1542 is decreased and the reflective properties of the sensor 1500 change. In particular, as the gap distance is decreased, the sensor 1500 reflects shorter wavelengths of light. Thus, the color of the sensor 1500 changes.

As mentioned above, the scaling material 1580 changes size, e.g. expands or contracts, depending on environmental parameters of the environment to which the scaling material is exposed. For example, the scaling material 1580 may expand as temperature increases and contract as temperature decreases. Many materials expand or contract at different temperatures according to their coefficient of thermal expansion. Some materials with very high coefficients of thermal expansion include gasoline, ethanol, rubber, water, mercury, PVC, and benzocyclobutene. Benzocyclobutene-based polymers can be used in manufacturing MEMS devices and, therefore, may be suitable for a MEMS sensor. Metals generally also have a high coefficient of thermal expansion, particularly lead, magnesium, aluminum, silver, copper, gold, nickel, iron, and platinum. In one embodiment, the scaling material 1580 has a higher coefficient of thermal expansion than that of the other components of the sensor 1500 such as the first layer 1510, second layer, 1520, third layer 1530, or spacers 1552, 1554. Generally, molybdenum, tungsten, glass, silicon, and quartz have lower coefficients of thermal expansion that the above-mentioned materials.

As another example, the scaling material 1580 may expand as pressure decreases and contract as pressure increases. Marshmallows, for example, expand when exposed to decreased pressure and contract when exposed to increased pressure. Other such materials include aerogels and polymer foams.

As another example, the scaling material 1580 may expand as the concentration of a particular gas, such as $O_2$, $N_2$, $SO$, $NO_3$, $H_2O$ (humidity), $CO$, or $CO_2$, increases and contract as the concentration of the particular gas decreases. Examples of such materials include cross-linked polyethylene oxide, hydrogels, hygroscopic aerogels, a polymeric material, thin poly (hydroxyethyl methacrylate) (PHEMA), poly (methyl methacrylate) (PMMA), and RTV silicone rubber.

As another example, the scaling material 1580 may expand as radiation increases and contract as radiation decreases. Examples of such a material include polymer networks containing azobenzene liquid-crystalline (LC) moieties, which are capable of changing their macroscopic shape when exposed to light.

In one embodiment, an infrared radiation sensor and false-color imaging display includes a packaging which houses a two-dimension array of sensors, such as described with respect to FIG. 12. Each sensor includes a first layer, second layer, and third layer, wherein the first layer and second layer are coupled together by a first spacer defining a first cavity and the second layer and third layer are coupled together by a second spacer defining a second cavity. In one embodiment, the second cavity houses a spacer material.

Figure 16:
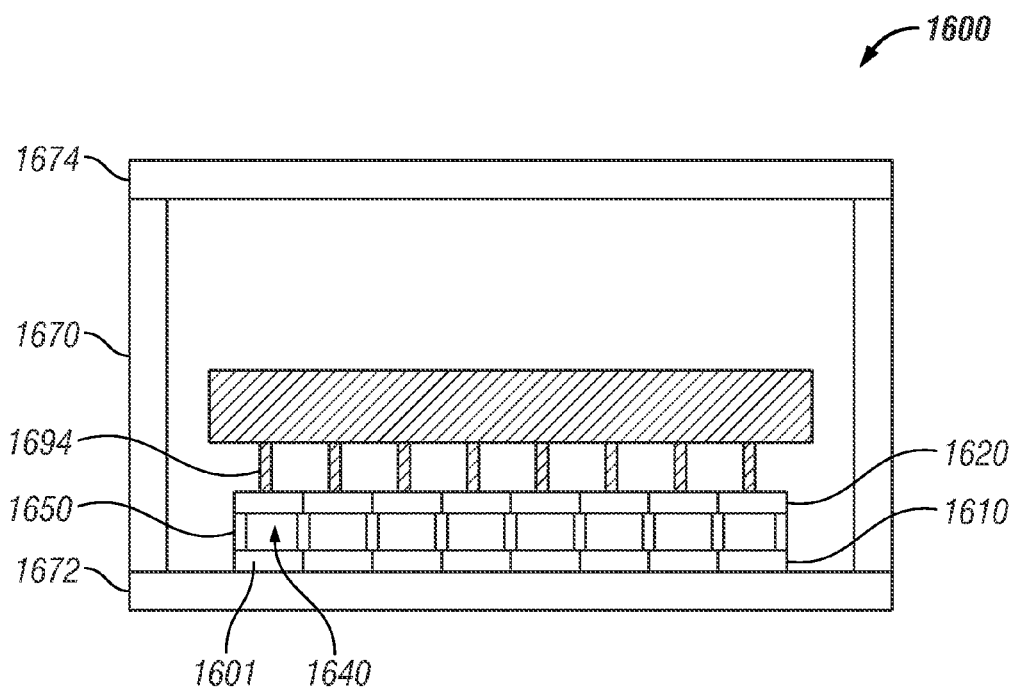
FIG. 16 is a cross section of an accelerometer.

FIG. 16 is a cross section of an accelerometer 1600. The accelerometer 1600 includes a packaging 1670 including a front plate 1672 and a back plate 1674. Within the packaging 1670 is a two-dimensional array of motion sensors 1601. Each sensor 1601 includes a first layer 1610 and a second layer 1620 coupled together by a spacer 1650 defining a cavity 1640 between the first layer 1610 and the second layer 1620. The spacer 1652 may be permeable, such that the cavity 1640 between the first layer 1610 and second layer 1620 is not hermetically sealed. In another embodiment, the spacer 1640 hermetically seals the first cavity.

In one embodiment, the first layer 1610 is at least partially reflective and partially transmissive and the second layer 1620 is at least partially reflective. Thus, the cavity 1640 can function as an interferometric cavity. As described above, the reflective properties of each the sensors 1601 depend, at least in part, on the gap distance between the first layer 1610 and second layer 1620. In one embodiment, each sensor 1601 reflects different wavelengths of light depending on the gap distance. Thus, each sensor 1601 appears as a different color depending on the gap distance.

In one embodiment, the second layer 1620 of each sensor 1601 is attached to a proof mass 1692 via a protrusion 1694. In one embodiment, the protrusions 1694 are elastic. In another embodiment, the protrusions 1694 are elastic and different protrusions 1694 have different spring constants. The accelerometer 1600 may be firmly attached to a body of interest, such as a vehicle. When the accelerometer 1600 moves or experiences other acceleration, the force of the proof mass 1692 moves the second layer 1620 either towards or away from the first layer 1610, changing the gap distance and changing the reflective properties of the sensor 1601. Because the reflective properties of each sensor 1601 are changed in accordance with the amount of force applied to the second layer 1620 by the inertia of the proof mass 1692, the two-dimension array of sensors 1601 will display a false-color image to a user by differentially reflecting incident light.

It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise.

While the above description points out certain novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A sensor, comprising:
a substrate;
a hermetically sealed cell formed on the substrate, wherein the hermetically sealed cell is at least partially defined by a first layer which is at least partially reflective and a second layer which is at least partially reflective and is positioned apart from the first layer and substantially parallel to the first layer; and
a backplate, wherein the substrate and the backplate are part of a non-hermetically sealed package housing the hermetically sealed cell,
the hermetically sealed cell organized into an array of hermetically sealed cells, each cell at least partially defined by a first layer which is at least partially reflective and a second layer which is at least partially reflective and is positioned apart from the first layer and substantially parallel to the first layer.

2. The sensor of claim 1, wherein the cell reflects a wavelength of light which is based on the pressure about the cell.

3. The sensor of claim 1, wherein the second layer moves towards or away from the first layer based on the pressure about the cell.

4. The sensor of claim 1, wherein the first layer and second layer are connected via an adjustable spacer, wherein adjusting the size of spacer increases or decreases an internal pressure of the cell.

5. The sensor of claim 1, further comprising an adjacent hermetically sealed cell at least partially defined by the second layer and a third layer which is at least partially reflective and is positioned apart from the second layer.

6. The sensor of claim 1, wherein the first layer and second layer are positioned apart by a gap distance so as to interferometrically modulate at least one wavelength of visible light.

7. The sensor of claim 6, wherein the gap distance is less than a millimeter.

8. The sensor of claim 1, further comprising an optical imaging system configured to focus an infrared radiation image onto the first layers of the array.

9. The sensor of claim 8, further comprising one or more thermally conductive heat removal channels.

10. The sensor of claim 8, wherein each cell reflects a wavelength of light which is based on the amount of infrared radiation impinging on the first layer of the cell.

11. The sensor of claim 8, wherein the second layer of each cell moves towards or away from the first layer of the cell based on the amount of infrared radiation impinging on the first layer of the cell.

12. A sensor comprising:
   a substrate;
   a first layer which is at least partially reflective formed on the substrate;
   a second layer which is at least partially reflective and is positioned apart from the first layer and substantially parallel to the first layer; and
   a scaling material between the first and second layers, wherein the distance between the first and second layers is dependent on the size of the scaling material, and wherein the size of the scaling material is dependent on the concentration of a particular gas about the sensor.

13. The sensor of claim 12, wherein the sensor reflects a wavelength of light which is based on the concentration of the particular gas about the sensor.

14. The sensor of claim 12, wherein the size of the scaling material is dependent on the concentration of water vapor.

15. The sensor of claim 12, wherein the size of the scaling material is dependent on the concentration of at least one of $SO$, $NO_3$, or $CO_2$.

16. The sensor of claim 12, wherein the scaling material is coupled to the first and second layers.

17. The sensor of claim 12, wherein the distance between the first and second layers is continuously dependent on the size of the scaling material.

18. The sensor of claim 12, further comprising a backplate, wherein the substrate and the backplate are part of a non-hermetically sealed package housing the first layer, second layer, and scaling material.

19. The sensor of claim 12, wherein the first layer and second layer are positioned apart by a gap distance so as to interferometrically modulate at least one wavelength of visible light.

20. A sensor comprising:
   a two-dimensional array of modulators, wherein each modulator comprises a first layer which is at least partially reflective and a second layer which is at least partially reflective and spaced apart from the first layer; and
   a proof mass attached to the two-dimensional array,
   wherein the two-dimensional array reflects light so as to display an image which is based on an acceleration of the sensor.

21. The sensor of claim 20, wherein the two-dimensional array reflects light so as to display an image which is based on an acceleration of the sensor in multiple directions.

22. The sensor of claim 21, wherein the multiple directions comprises at least one of a linear direction or a rotational direction.

23. The sensor of claim 20, wherein the proof mass comprises a plurality of protrusions and wherein each protrusion is attached to one of the first layers.

24. A sensor comprising:
   a substrate;
   a hermetically sealed cell formed on the substrate, wherein the hermetically sealed cell is at least partially defined by a first layer which is at least partially reflective and a second layer which is at least partially reflective and is positioned apart from the first layer and substantially parallel to the first layer,
   wherein the first layer and second layer are connected via an adjustable spacer, and wherein adjusting the size of spacer increases or decreases an internal pressure of the cell.

25. The sensor of claim 24, wherein the cell reflects a wavelength of light which is based on the pressure about the cell.

26. The sensor of claim 24, wherein the second layer moves towards or away from the first layer based on the pressure about the cell.

27. The sensor of claim 24, further comprising an adjacent hermetically sealed cell at least partially defined by the second layer and a third layer which is at least partially reflective and is positioned apart from the second layer.

28. The sensor of claim 24, wherein the first layer and second layer are positioned apart by a gap distance so as to interferometrically modulate at least one wavelength of visible light.

29. The sensor of claim 24, comprising an array of hermetically sealed cells formed on the substrate, wherein each cell is at least partially defined by a first layer which is at least partially reflective and a second layer which is at least partially reflective and is positioned apart from the first layer and substantially parallel to the first layer.

30. A sensor comprising:
   a substrate;
   an array of hermetically sealed cells formed on the substrate, wherein each cell is at least partially defined by a first layer which is at least partially reflective and a second layer which is at least partially reflective and is positioned apart from the first layer and substantially parallel to the first layer, and
   an optical imaging system configured to focus an infrared radiation image onto the first layers of the array.

31. The sensor of claim 30, wherein the first layers and second layers are positioned apart by a gap distance so as to interferometrically modulate at least one wavelength of visible light.

32. The sensor of claim 30, further comprising one or more thermally conductive heat removal channels.

33. The sensor of claim 30, wherein each cell reflects a wavelength of light which is based on the amount of infrared radiation impinging on the first layer of the cell.

34. The sensor of claim 30, wherein the second layer of each cell moves towards or away from the first layer of the cell based on the amount of infrared radiation impinging on the first layer of the cell.

35. A sensor comprising:
   a two-dimensional array of modulators, wherein each modulator comprises a first layer which is at least partially reflective and a second layer which is at least partially reflective and spaced apart from the first layer; and
   a proof mass attached to the two-dimensional array,
   wherein the proof mass comprises a liquid or granular material encased in a case such that the liquid or granular material contacts at least a portion of the array when the sensor accelerates.

36. The sensor of claim 35, wherein the two-dimensional array reflects light so as to display an image which is based on an acceleration of the sensor.

37. The sensor of claim 36, wherein the two-dimensional array reflects light so as to display an image which is based on an acceleration of the sensor in multiple directions.

38. The sensor of claim 37, wherein the multiple directions comprises at least one of a linear direction or a rotational direction.

39. The sensor of claim 35, wherein the proof mass comprises a plurality of protrusions and wherein each protrusion is attached to one of the first layers.

* * * * *